Oct. 29, 1935. C. S. SWANSON ET AL 2,018,931
CRANK SHAFT FORMING MACHINE
Filed Aug. 1, 1932 8 Sheets-Sheet 1
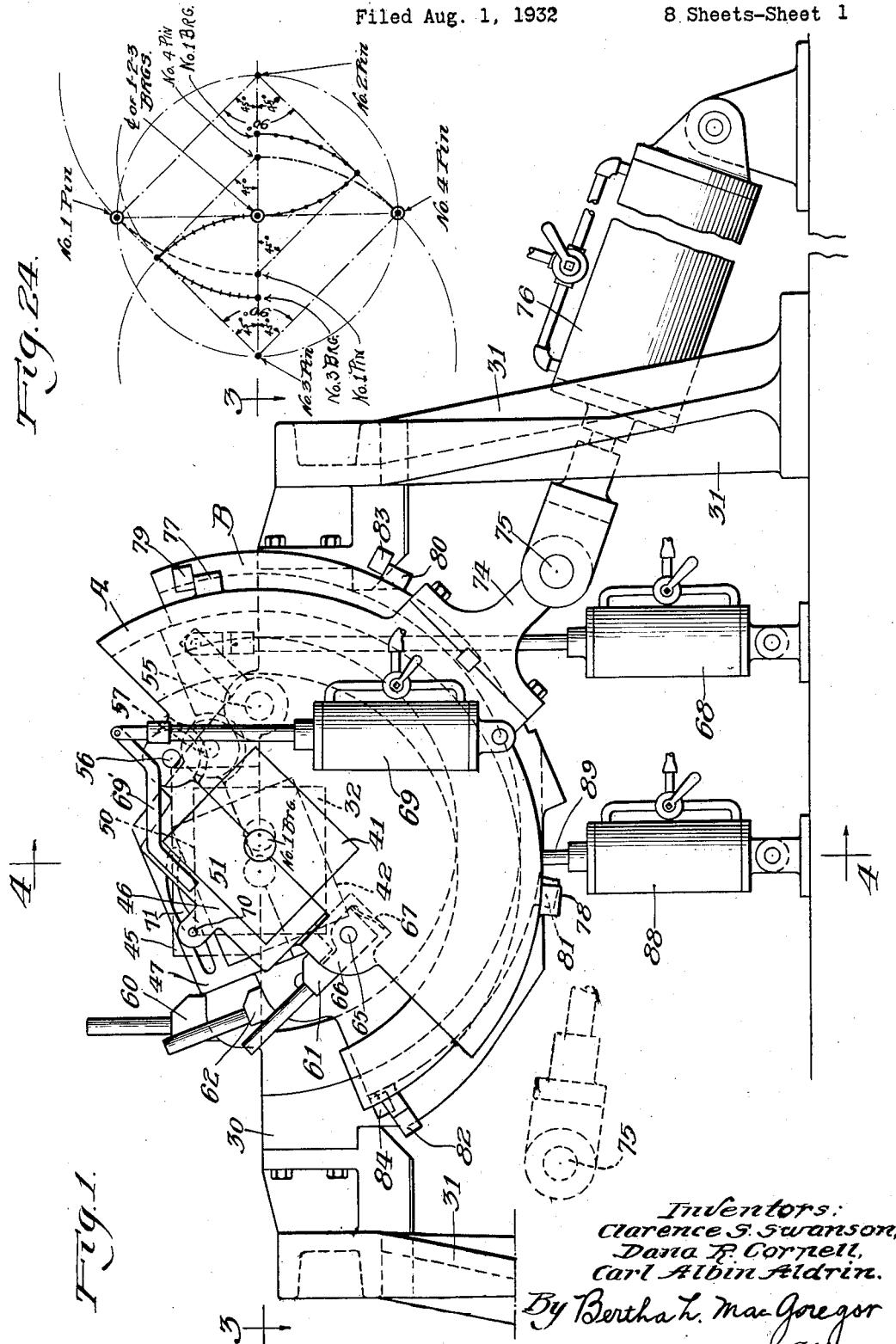
Inventors:
Clarence S. Swanson,
Dana R. Cornell,
Carl Albin Aldrin.
By Bertha L. MacGregor
Attorney Oct. 29, 1935.  C. S. SWANSON ET AL  2,018,931
CRANK SHAFT FORMING MACHINE
Filed Aug. 1, 1932   8 Sheets-Sheet 2
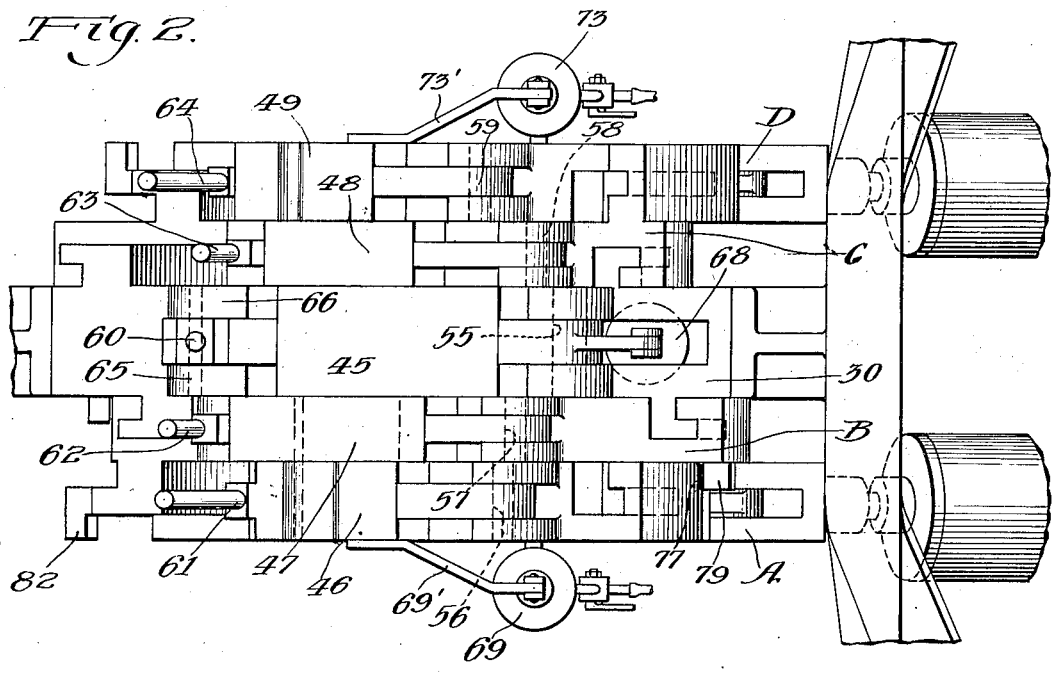
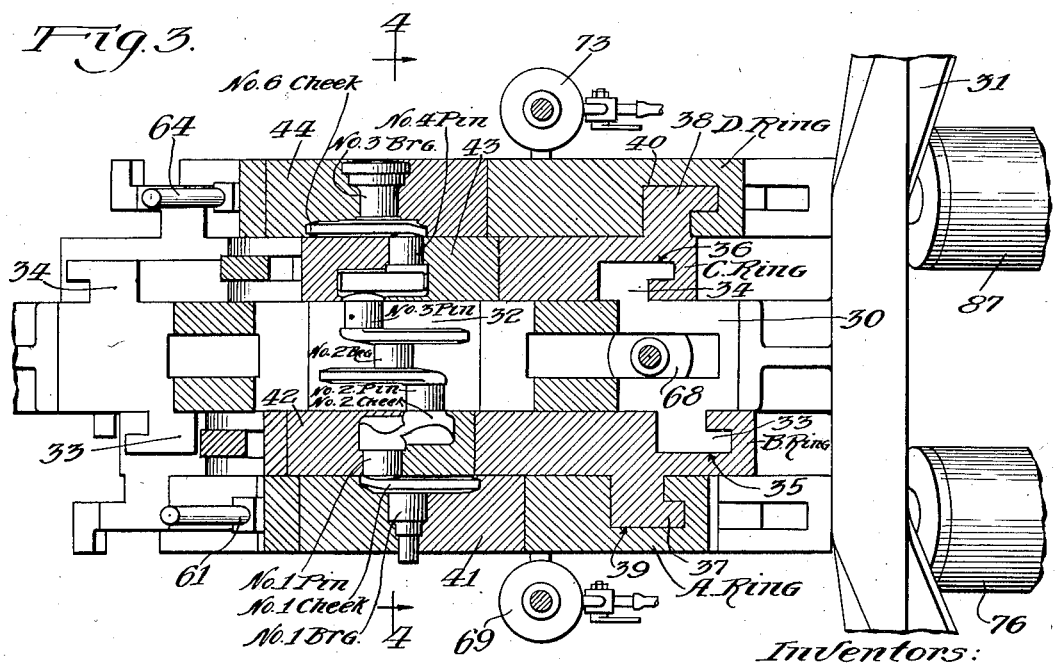
Inventors:
Clarence S. Swanson,
Dana R. Cornell,
Carl Albin Aldrin.
By Bertha L. MacGregor
Attorney Oct. 29, 1935.  C. S. SWANSON ET AL  2,018,931
CRANK SHAFT FORMING MACHINE
Filed Aug. 1, 1932   8 Sheets-Sheet 3
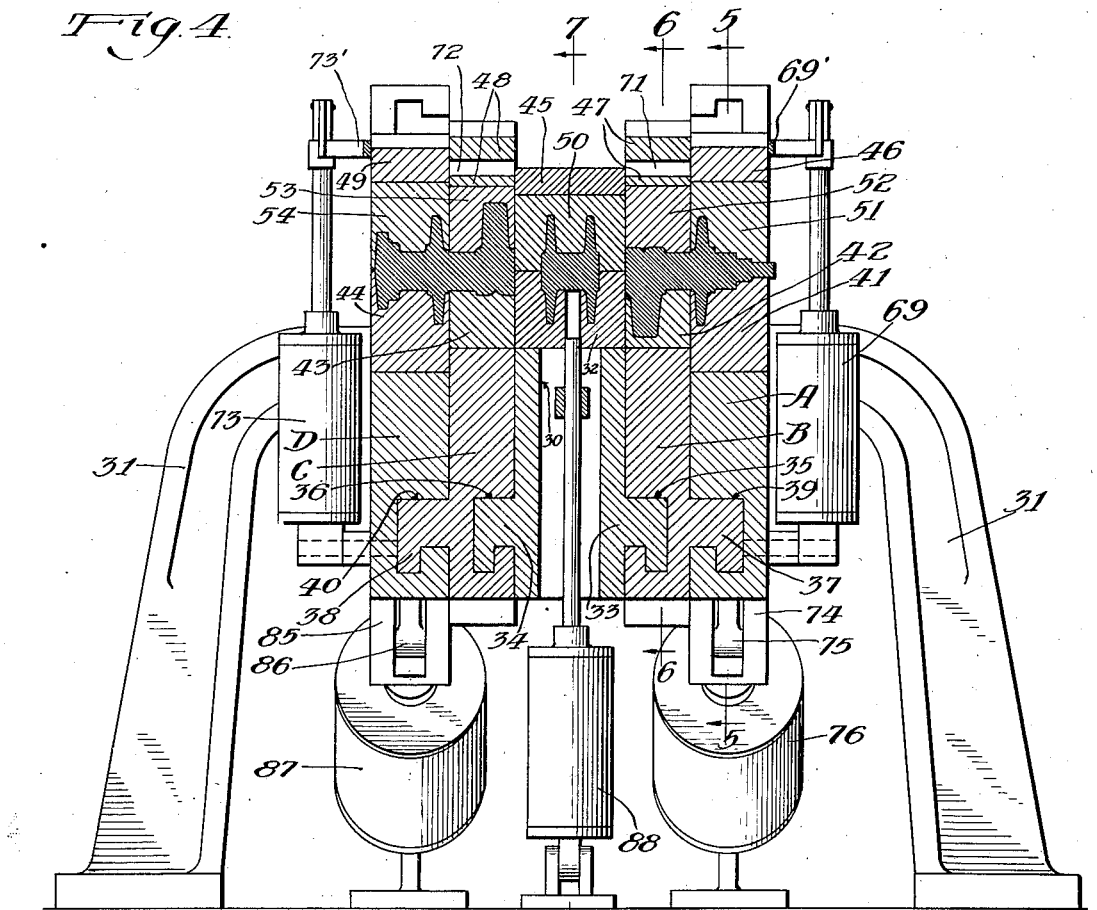
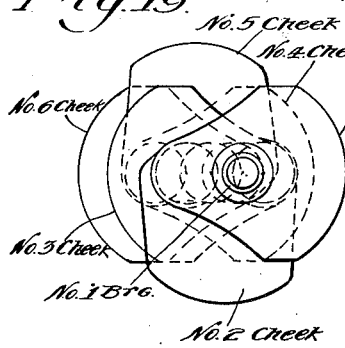
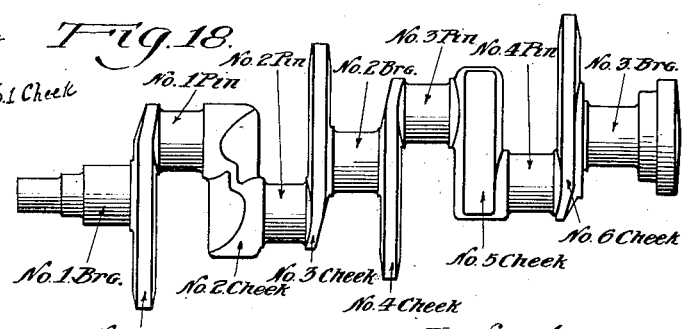
Inventor:
Clarence S. Swanson,
Dana R. Cornell,
Carl Albin Aldrin.
By Bertha L. MacGregor
Attorney Oct. 29, 1935.  C. S. SWANSON ET AL  2,018,931
CRANK SHAFT FORMING MACHINE
Filed Aug. 1, 1932   8 Sheets-Sheet 4
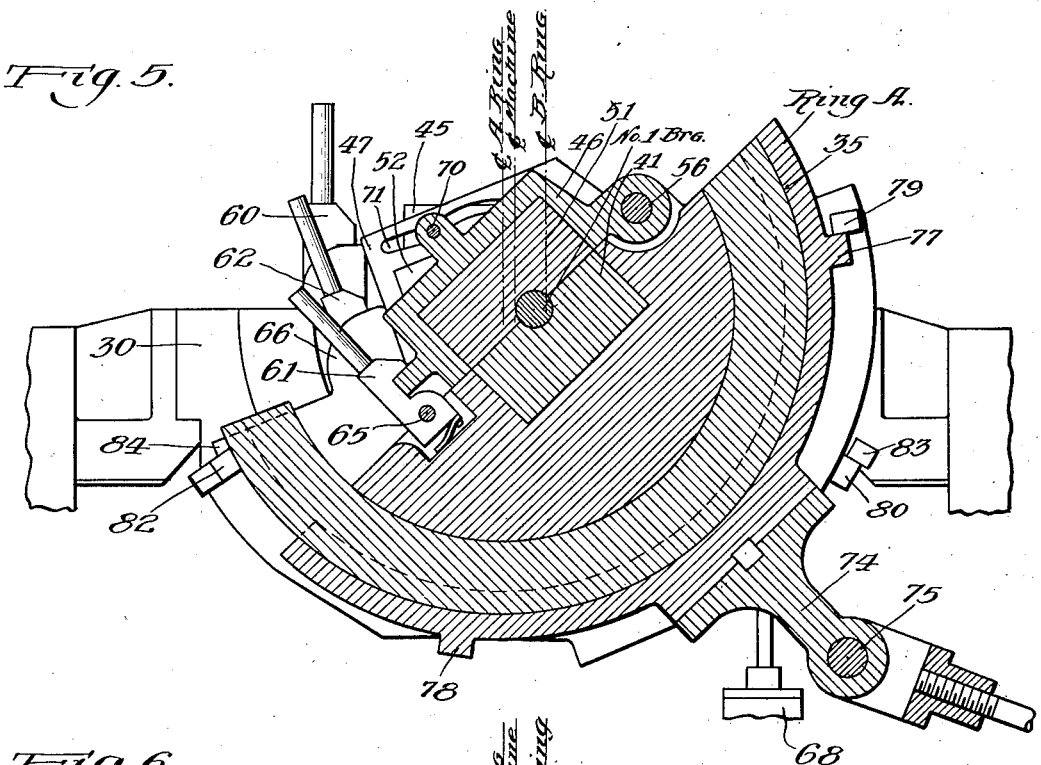
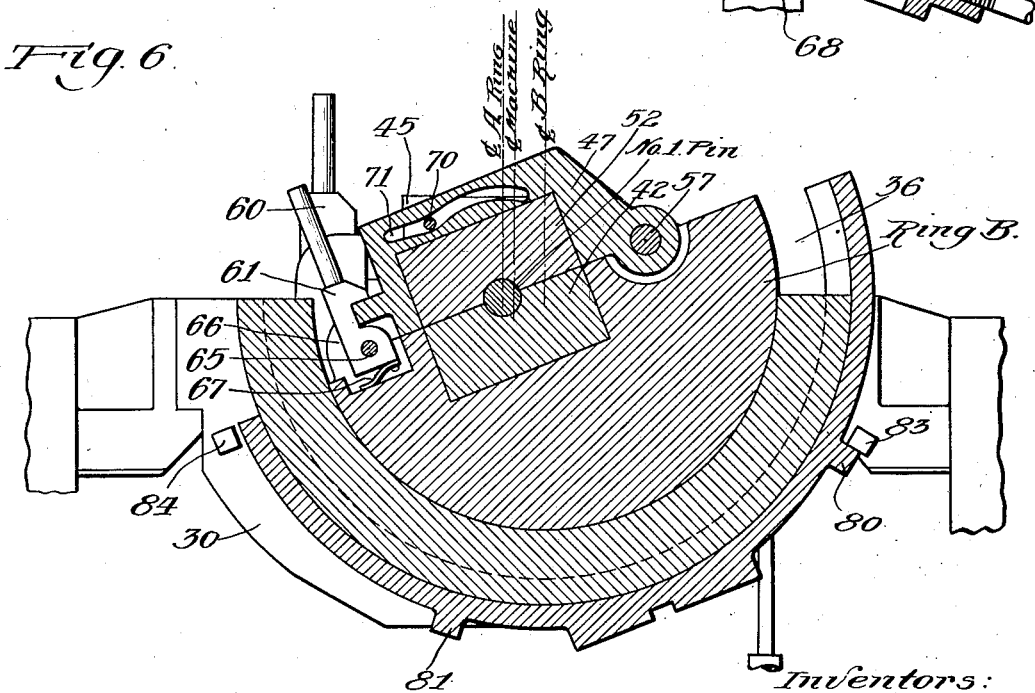
Inventors:
Clarence S. Swanson,
Dana R. Cornell,
Carl Albin Aldrin,
By Bertha L. MacGregor
Attorney

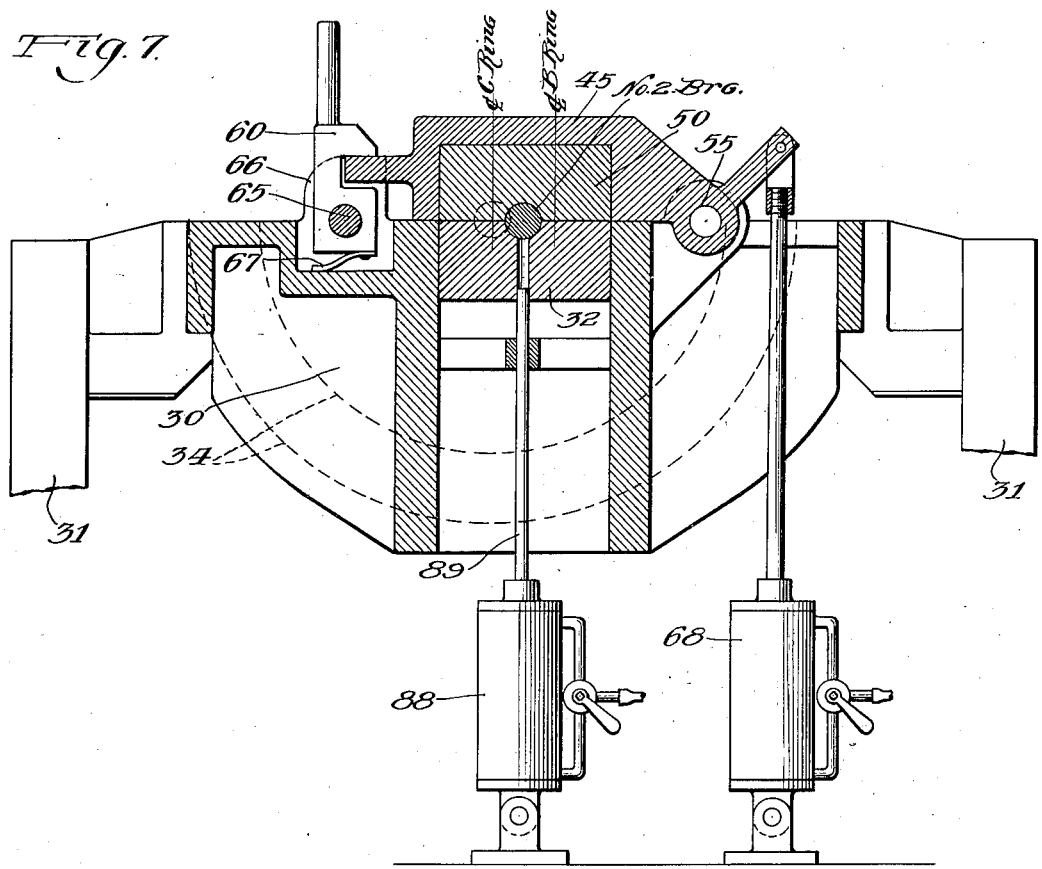
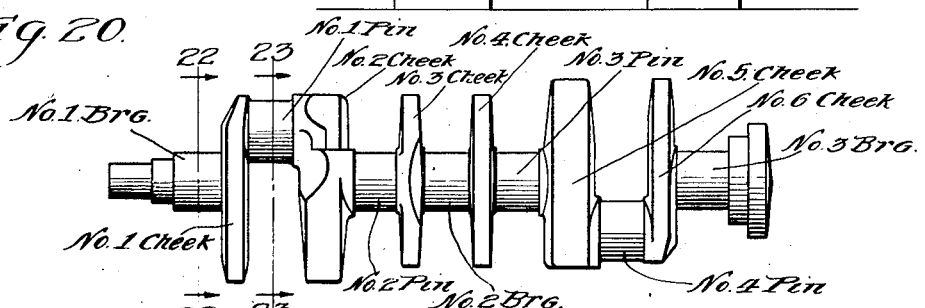
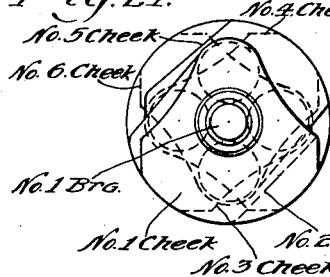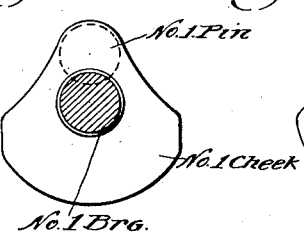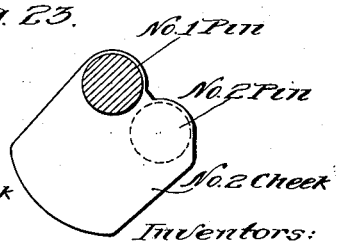

Oct. 29, 1935.　　C. S. SWANSON ET AL　　2,018,931
CRANK SHAFT FORMING MACHINE
Filed Aug. 1, 1932　　8 Sheets-Sheet 6

Inventors:
Clarence S. Swanson,
Dana F. Cornell,
Carl Albin Aldrin;
By Bertha L. MacGregor
Attorney.

Inventors:
Clarence S. Swanson,
Dana R. Cornell,
Carl Albin Aldrin
By Bertha L. MacGregor
Attorney.

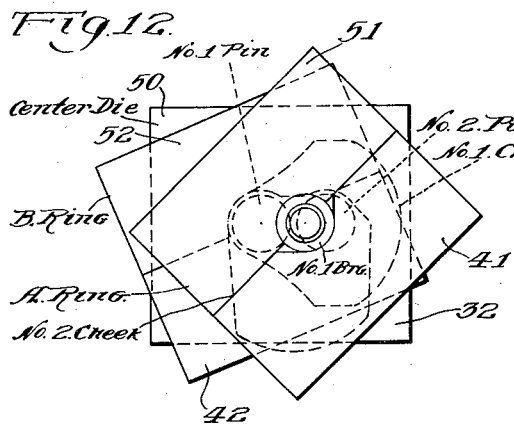
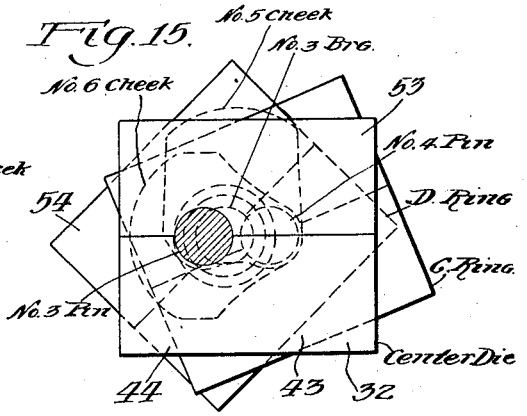
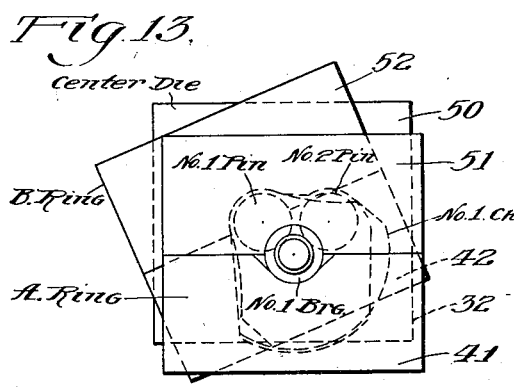
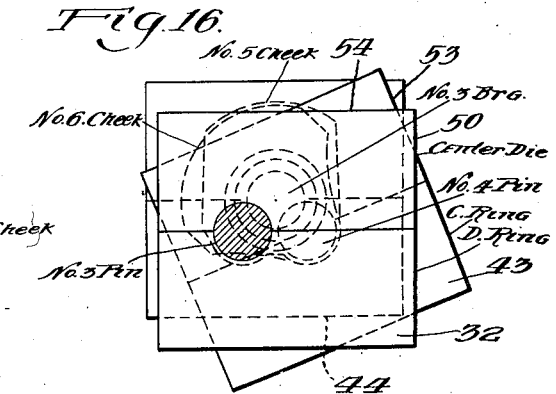
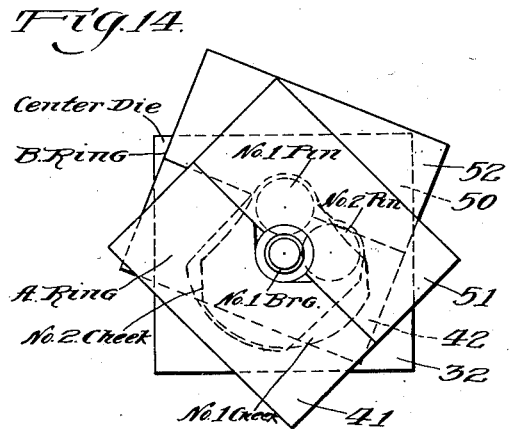
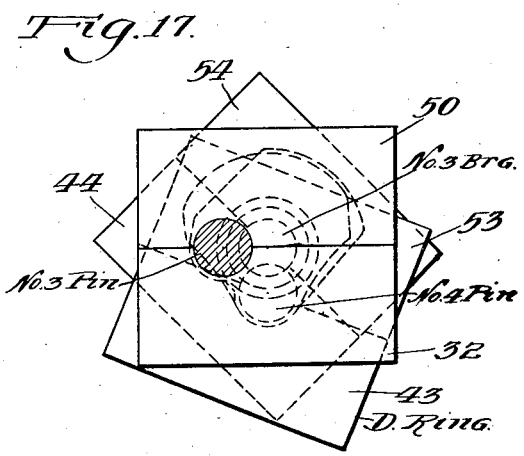

Patented Oct. 29, 1935

2,018,931

UNITED STATES PATENT OFFICE 2,018,931

CRANK SHAFT FORMING MACHINE

Clarence S. Swanson, Chicago, Ill., and Dana R. Cornell and Carl Albin Aldrin, East Chicago, Ind., assignors to Standard Forgings Company, Chicago, Ill., a corporation of Illinois Application August 1, 1932, Serial No. 627,202

15 Claims. (Cl. 29—6)

This invention relates to crank shaft forming machines adapted for forming forged crank shafts into any desired shape.

As forged, a crank shaft has its bearings and pins disposed axially in one horizontal plane. The invention is directed to a machine for moving some of the bearings and pins and intermediate cheeks relatively to certain other parts of the shaft, for the purpose of disposing the bearings in alignment, and the pins in proper predetermined positions relatively to the bearings and to each other.

One of the objects of the invention is to produce a machine in which the forged crank shaft will be completely embedded during the forming operation; one which holds axially stationary certain parts of the shaft and accurately controls the movement of those parts of the shaft intended to be moved; which prevents undesirable and unintended distortion of the shaft, and results in the production of a balanced shaft.

Another object is to produce a machine which is a complete operative unit, simple and sturdy in construction, and into which the shafts to be formed may be loaded by a vertical drop movement without interference or obstruction by any machine parts.

In the present embodiment we have chosen to illustrate a forming machine adapted to form a crank shaft provided with three main bearings and four pins. The parts comprising this shaft, beginning with fan pulley end, are No. 1 bearing, No. 1 cheek, No. 1 pin, No. 2 cheek, No. 2 pin, No. 3 cheek, No. 2 bearing, No. 4 cheek, No. 3 pin, No. 5 cheek, No. 4 pin, No. 6 cheek, and No. 3 bearing. As forged, the three bearings and the four pins are axially in one horizontal plane, but their axes are disposed in seven different vertical planes. The function of the forming machine which we have chosen for purposes of illustration is to put the bearings into axial alignment and to dispose the pins so they are equidistantly spaced radially from the bearings and spaced 90 degrees from an adjacent pin.

The forming machine herein shown and described is adapted for forming the crank shaft referred to, which has been selected as one example of the invention. The machine comprises a stationary housing, a semi-circular ring member mounted on each side of the center housing and movable relatively thereto, and a second semi-circular ring member mounted on each of said first mentioned rings and movable relatively thereto.

In the following specification these ring members will be referred to as rings A, B, C, and D, respectively, the stationary housing being located between rings B and C which are movable on said housing; ring A being movable on ring B, and ring D being movable on ring C. This arrangement of parts is suitable for forming a crank shaft in which four parts of the forged shaft, two at each side of the center bearing, require bodily movement in order to assume their proper positions in the formed shaft. This bodily movement of the said four parts in the present embodiment consists in first moving each of the end bearings 45 degrees relatively to a certain center, the two centers being different, and then moving each of the two bearings together with an associated pin 45 degrees relatively to a certain center, the two centers being different from each other and from the first mentioned centers, as will more fully appear hereinafter.

Obviously the number of forming rings and the relative locations of the rings and the stationary housing may be altered as required for forming other shafts having different numbers of pins and bearings, and having the pins spaced from adjacent pins more or less than 90 degrees.

In the drawings:

Fig. 1 is a side elevation of a crank shaft forming machine embodying our invention, as viewed from the A ring side. For clarity, rings C and D have not been shown in this figure.

Fig. 2 is a top plan view of the machine in the position shown in Fig. 1, but including rings C and D.

Fig. 3 is a horizontal sectional view taken on the line 3—3 of Fig. 1.

Fig. 4 is a transverse vertical sectional view taken on the line 4—4 of Fig. 1.

Figs. 5, 6, and 7 are longitudinal vertical sectional views taken on the lines 5, 6, and 7, respectively, of Fig. 4.

Figure 8:
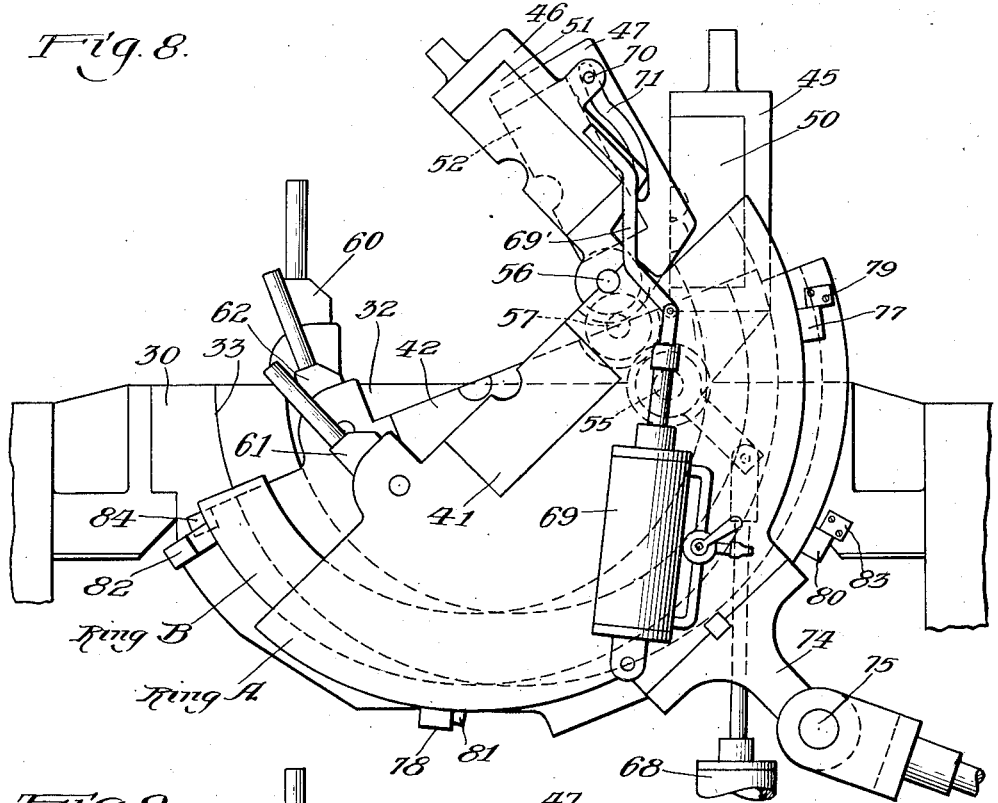

Fig. 8 is a side elevation of the forming machine with the parts in the same position as shown in Fig. 1, but showing the pivoted caps raised. This view indicates the loading position of the machine parts, preparatory to receiving a crank shaft to be formed.

Figure 9:
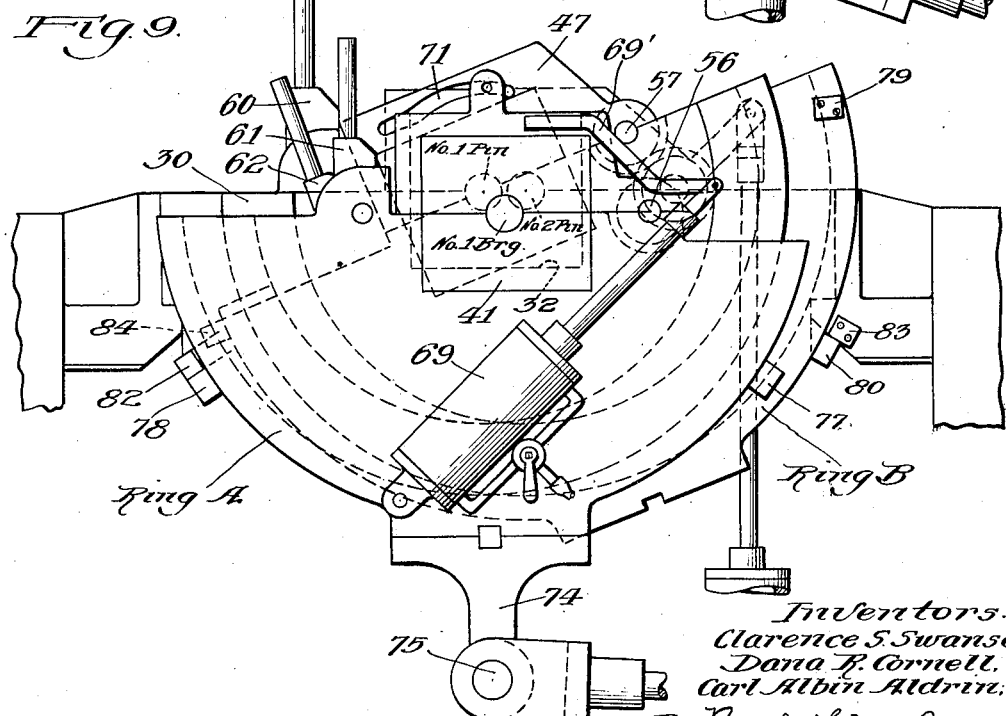

Fig. 9 is a view similar to Fig. 8, but showing the pivoted caps closed, and A ring moved 45 degrees from the position shown in Fig. 8.

Figure 10:
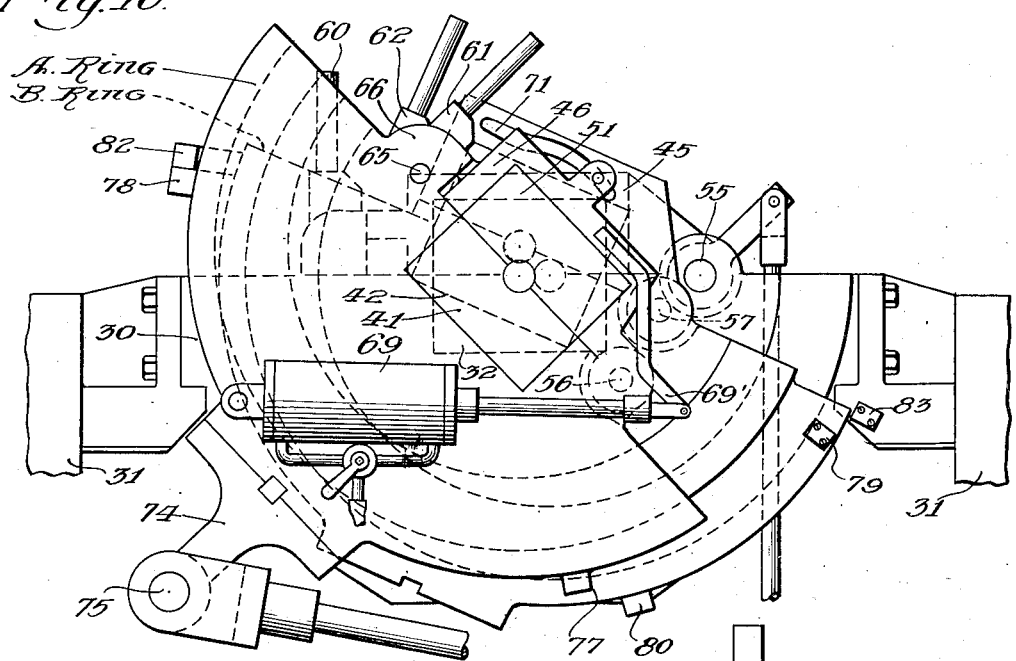

Fig. 10 is a view similar to Fig. 9 with A and B rings moved 45 degrees from the positions shown in Fig. 9.

Figure 11:
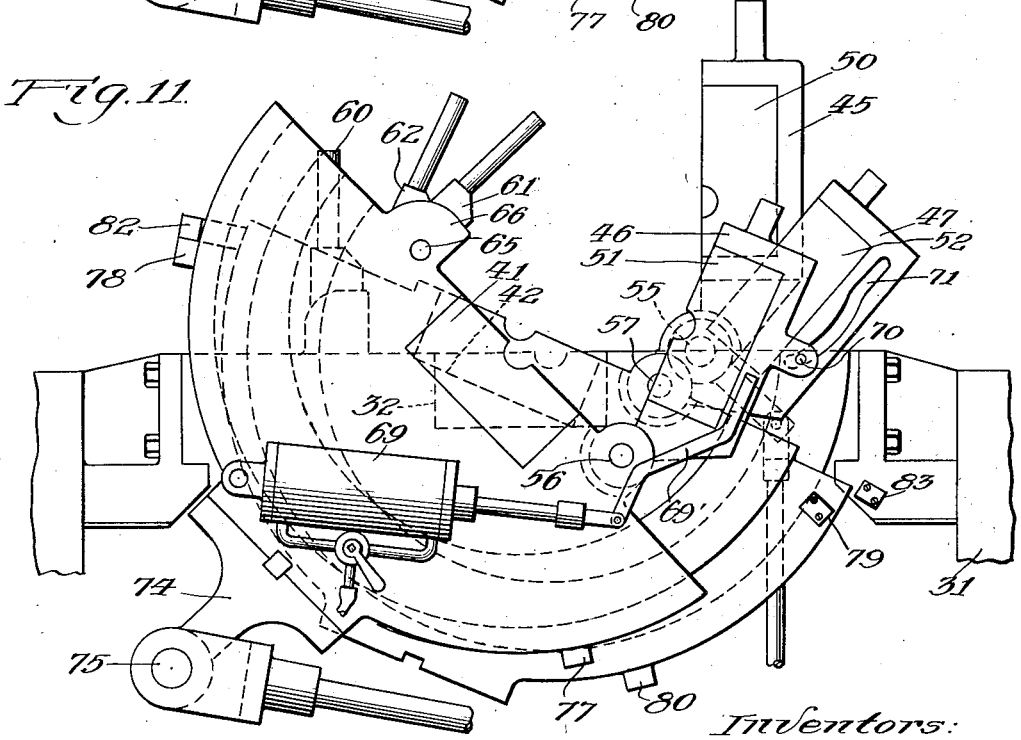

Fig. 11 is a view similar to Fig. 10 but showing the caps in open position. This is the unloading position of the machine parts.

Fig. 12 is a side elevation of the forming dies in rings A and B and stationary housing as viewed from the A ring side of the machine, showing the position of the dies and of the crank shaft at the beginning of the forming operation.

Fig. 13 is a view similar to Fig. 12 showing the same parts after the die of ring A has been moved 45 degrees about a certain center from the position shown in Fig. 12.

Fig. 14 is a view similar to Figs. 12 and 13, showing the position of the parts after the dies of rings A and B have been moved 45 degrees, about another center, from the position shown in Fig. 13.

Fig. 15 corresponds to Fig. 12 but shows forming dies in the stationary housing and in rings C and D, as viewed from a section through said housing die, showing the dies and shaft at the beginning of the forming operation.

Fig. 16 is a view similar to Fig. 15 but showing the die of ring D moved 45 degrees about a certain center from the position shown in Fig. 15.

Fig. 17 is a view similar to Figs. 15 and 16, showing the position of the parts after the dies of rings D and C have been moved 45 degrees, about another center, from the position shown in Fig. 16.

Fig. 18 is a plan view of a crank shaft which is to be formed in the machine of our invention. As forged, this crank shaft has the axes of its pins and bearings located in one horizontal plane and the view is a plan of the shaft as thus disposed in its forging position.

Fig. 19 is an end view of the shaft shown in Fig. 18.

Fig. 20 is a side elevation view of the shaft of Fig. 18 after it has been formed in the machine of our invention.

Fig. 21 is an end view of the shaft shown in Fig. 20.

Figs. 22 and 23 are sectional views taken on the lines 22 and 23, respectively, of Fig. 20.

Fig. 24 is a diagrammatic view indicating the movements of the shaft parts which occur in the forming machine during the forming operation.

In that embodiment of the invention shown in the drawings, the stationary housing is indicated at 30, and legs for supporting same at 31. At one side of the housing 30 are semi-circular rings A and B, and at the other side similar rings C and D.

The stationary housing 30 is shown in longitudinal vertical section in Fig. 7, in horizontal section in Fig. 3, and transverse vertical section in Fig. 4. Its contour is substantially semi-circular in side elevation, with the top surface flat but recessed midway between its ends to receive a die 32 securely held in the housing 30. The upper face of the die 32 is recessed to form depressions complemental to the lower half of certain parts of a horizontally disposed forged crank shaft; in this instance the die 32 receives No. 2 pin, No. 3 cheek, No. 2 bearing, No. 4 cheek and No. 3 pin (Fig. 3).

On one side the housing 30 is provided with a semi-circular lip 33 on which a ring B is movably mounted, and on the other side, the housing 30 is provided with a similar lip 34 on which a ring C is movably mounted. The rings B and C are also semi-circular in side elevation, and on their sides toward the housing 30, they are provided with grooves 35, 36, respectively, for receiving the housing lips 33 and 34, respectively. Opposite their inner, grooved sides, the rings B and C carry semi-circular lips 37, 38, respectively, which fit complemental grooves 39, 40 in rings A and D, respectively (best shown in Figs. 3 and 4).

The rings A, B, C and D are flat topped, but recessed medially to receive dies 41, 42, 43 and 44, respectively. The upper faces of the dies are recessed as heretofore explained in connection with die 32 of the stationary housing 30. In the present embodiment, die 41 in ring A receives No. 1 bearing and No. 1 cheek; die 42 in ring B receives No. 1 pin and No. 2 cheek; die 43 in ring C receives No. 5 cheek and No. 4 pin; and die 44 in ring D receives No. 6 cheek and No. 3 bearing of the shaft as forged (Figs. 4–7, incl.). The upper edges of the dies adjacent the shaft-receiving depressions are slightly cut away or inclined to facilitate positioning of the shaft in the dies.

The stationary housing 30 and rings A, B, C and D are each provided with caps pivotally mounted on said parts. The cap on the housing 30 is indicated at 45; on ring A, at 46; on ring B, at 47; on ring C at 48; and on ring D, at 49. Each cap is recessed on its lower surface to receive a die which is shaped complementally to the upper half of that part of the shaft resting in the housing and ring dies heretofore described. The die in housing cap 45 is indicated at 50; in ring A cap 46, at 51; in ring B cap 47, at 52; in ring C cap 48, at 53; and in ring D cap 49, at 54.

The caps 45, 46, 47, 48 and 49 are as wide as the housing or ring on which they are pivotally mounted at 55, 56, 57, 58 and 59, respectively. The caps are held in lowered or closed position on their respective rings or stationary housing by latches pivotally mounted on the rings and housing. The latches on the stationary housing 30 and on rings A, B, C and D are indicated at 60, 61, 62, 63, and 64, respectively. The latches are all alike and the construction will be understood by reference to Figs. 5, 6, and 7, showing the pivotal mountings 65, between pairs of ears 66 formed on the housing 30 and rings, and spring 67 for urging the latches toward their latching positions.

In Figs. 8 and 11 the caps are shown raised, in open position. For sake of clarity they are not shown in true vertical positions, one directly behind another in the elevational views, but it will be understood that preferably they will move sufficiently relatively to the housing 30 and rings A, B, C and D to stand vertically and permit loading by a vertical drop of the crank shaft.

The caps are actuated as follows: cap 45 on housing 30 (Fig. 7) is connected to the piston rod of an air cylinder 68 or other suitable source of power, manually or automatically operable; cap 46 on ring A (Figs. 1, 8–11) is operatively connected by an arm 69' to the piston rod of an air cylinder 69 mounted on the ring A, and cap 47 on ring B is operatively connected with cap 46 on ring A by a pin 70 on cap 46 movable in a curved slot 71 in cap 47. Cap 48 on ring C is similarly connected to cap 49 on ring D by a pin (not shown) on cap 49 movable in a curved slot 72 on cap 48 (Fig. 4), and cap 49 on ring D is operatively connected by an arm 73' to the piston rod of an air cylinder 73 mounted on the ring D.

Ring A is actuated relatively to ring B, and together with ring B relatively to the stationary housing, by the following means: ring A is provided with an extension 74 pivotally connected at 75 to the piston rod of an air cylinder 76. In this embodiment, ring B is not provided with independent power means, but is arranged to be moved with ring A by contact of certain stops on rings A and B during part of the movement of ring A. Ring A is provided with two stops, 77, 78; ring B is provided with four stops, 79, 80, 81, 82. The stationary housing has two stops, 83, 84, on that side toward ring B. The function of the stops will be apparent from the explanation of operation to be contained herein. The opposite side of the housing 30 and the rings C and D are also provided with stops (not shown) as will be explained later. The ring D is equipped with an extension 85 pivotally connected at 86 to the piston rod of an air cylinder 87 (Fig. 4), corresponding to the parts 74, 75, and 76 of ring A, and the actuation of ring D (by reason of said contacting stops) carries ring C with ring D during part of the movement of ring D.

The machine is preferably provided with means for facilitating the removal of the formed shaft, and said means may consist of a foot operated treadle or an air cylinder 88 and reciprocating rod 89 actuated thereby, shown in Fig. 7. The rod 89 extends upwardly through the die 32 in the housing 30 and is arranged to contact with the formed shaft and force it upwardly out of the dies at the end of the forming operation.

*Operation*:—In the loading position of the machine described, the upper surfaces of the rings are inclined, the highest point of rings A and D being 45 degrees above the horizontal, and of rings B and C 22½ degrees above the horizontal.

In order to open the caps on rings A and D, the caps must move 135 degrees to assume the vertical position for loading. To open the caps on rings B and C, in the loading position, the caps must move 112½ degrees to reach the vertical position.

The axis on which ring A turns during the first step of the forming operation is located slightly to the left of the transverse center line of the machine, as shown in Fig. 5, and said center coincides with the axis of No. 1 pin located in ring B. Thus, after a forged shaft (Figs. 18 and 19) is positioned in the machine (Fig. 8), and the caps are closed (Fig. 1), a 45 degree movement of ring A (carrying No. 1 bearing and No. 1 cheek) about said axis of No. 1 pin, bodily moves No. 1 bearing from the position shown in Fig. 12 to that of Figs. 13 and 9, and simultaneously the No. 1 pin, held axially stationary in ring B during this initial movement of ring A, will be twisted.

At the beginning of the initial 45 degree movement of ring A on ring B, the stops 77 and 79 on rings A and B, respectively, will be in engagement, and B ring stop 80 will be in contact with housing stop 83, as shown in Figs. 1, 5, and 8. At the end of said 45 degree movement the A ring stop 78 will engage B ring stop 82, as in Fig. 9. The engagement of these stops results in moving B ring with A when the latter is actuated by its power 76 in the next stage of the operation.

Said next movement of ring A, carrying ring B with it, is a 45 degree movement about the center line of B ring (Fig. 6) which coincides with the axis of the No. 2 pin held axially stationary in the housing 30 (Figs. 3 and 7). This 45 degree movement of rings A and B about the center line of B ring, results in bodily moving No. 1 bearing and No. 1 pin from the positions shown in Figs. 9 and 13 to the positions indicated in Figs. 10, 11 and 14, and simultaneously with said bodily movement of these parts, the No. 2 pin held axially stationary in the housing 30, is being twisted.

The movement of rings A and B together is limited by engagement of B ring stop 81 with housing stop 84. These stops 81 and 84 are contacting in the positions of the rings as shown in Figs. 10 and 11, but to avoid confusion these stops have been left out in said figures. Their positions on ring B and housing 30 are clearly indicated in Fig. 6.

The effect of this 45 degree movement of ring A about a certain center, and of the 45 degree movement of rings A and B, together about another center, is to bring No. 1 bearing into axial alignment with No. 2 bearing, and to move No. 1 pin to a position 90 degrees from No. 2 pin, as indicated in Figs. 12 to 14, inclusive, and in Figs. 1, 9, and 10.

Ring D is actuated simultaneously with ring A, and rings D and C simultaneously with A and B, but rings D and A do not rotate about the same centers, nor do rings B and C. Ring D, carrying No. 3 bearing and No. 6 cheek, rotates 45 degrees about the axis of No. 4 pin, located in ring C, and then, by reason of the contacting stops on rings D and C, both rings move 45 degrees about the axis of No. 3 pin held axially stationary in the housing 30. The result is that No. 3 bearing is first moved bodily from the position shown in Fig. 15 to that of Fig. 16, and simultaneously with this movement of No. 3 bearing, No. 4 pin is held axially stationary but is being twisted; and then both No. 3 bearing and No. 4 pin are moved from the positions shown in Fig. 16 to those shown in Fig. 17, and simultaneously with said movement, No. 3 pin is being twisted while axially stationary in the housing 30.

The effect of this 45 degree movement of ring D about a certain center, and of the 45 degree movement of rings D and C, together, about another center (none of said centers coinciding with the centers on which ring A, or rings A and B rotate), is to bring No. 3 bearing into axial alignment with No. 2 bearing, and to move No. 4 pin to a position 90 degrees from No. 3 pin, as indicated in Figs. 15 to 17, inclusive. In the finished form, No. 1 and No. 4 pins are diametrically opposite each other, and 90 degrees from No. 2 and No. 3 pins, and all the bearings are in axial alignment.

In Fig. 24 is shown a diagrammatic view indicating the paths in which the axes of the various parts of the forged shaft are moved in the forming operation. The center line of No. 1 bearing is indicated by a heavy dot so marked, and said dot is connected with another heavy dot by a line of small dots. This indicates the 45 degree movement of No. 1 bearing in ring A about the axis of No. 1 pin in the shaft as forged. Then the movement of No. 1 bearing continues for 45 degrees about the axis of No. 2 pin to the point where said line of small dots terminates in a heavy dot surrounded by a circle.

The axis of No. 1 pin, in ring B, is indicated by the heavy dot so marked, and its 45 degree travel about the axis of No. 2 pin is shown by the line of dashes ending at the heavy dot surrounded by a circle.

The axis of No. 3 bearing, in ring D, is indicated by a heavy dot so marked; its 45 degree movement about the axis of No. 4 pin is shown by the line with cross dashes extending to the heavy dot, and its next movement of 45 degrees about the axis of No. 3 pin is shown by a similar line which terminates in a heavy dot surrounded by a circle.

The axis of No. 4 pin, in ring C, is indicated by the heavy dot so marked, and its 45 degree travel about the axis of No. 3 pin is shown by the dot and dash line terminating at the heavy dot surrounded by a circle.

This diagram clearly shows how the axes of the pins and bearings of the forged shafts are in one horizontal plane but in seven different vertical planes, and at the end of the forming all the bearings are in alignment with the center main bearing No. 2, and the pins are 90 degrees from an adjacent pin.

In the present machine all the rings move clock-wise. In machines for forming some other crank shafts, the rings A and B may work in opposite directions and, therefore, independent sources of power should be supplied for each of the rings in place of the stops herein described for carrying ring B with ring A.

The slots and pins which operatively connect the caps of two rings together may be dispensed with if separate power is applied to each of the caps for actuating same.

In order to assemble the rings B and C on the housing 30 and the rings A and D on the rings B and C, respectively, it is necessary to attach some of the stops subsequently to the assembling; in the present embodiment, stops 79 and 83 are so attached to ring B and stationary housing.

Changes may be made in details of construction without departing from the scope of our invention and we do not intend to be limited to the exact form shown and described, except as set forth in the appended claims. For example, the means for actuating the rings and cover caps may be varied, and the form and location of the rings and dies is illustrative of one embodiment. We also find it convenient in practice to eliminate from the ring dies and cap dies some of the metal adjacent the inner sides of the rings, namely, that shown in Fig. 4 adjacent the left sides of cheeks Nos. 1 and 2 and right sides of cheeks Nos. 5 and 6.

We claim:—

1. A crank shaft forming machine comprising a stationary die adapted to receive part of a crank shaft, a semi-circular lip extending outwardly from the side of the stationary die, a movable die provided with a groove on one side complemental to the lip on the stationary die and mounted on said lip, a semi-circular lip on the opposite side of the movable die, a second grooved movable die mounted on the lip of the first movable die, said movable dies being arranged to rotate about different axes, stops on the several dies for limiting the movement of the movable dies, and stops on the movable dies arranged to contact with each other when one movable die has moved to a predetermined extent relatively to the other movable die.

2. A crank shaft forming machine comprising a stationary die, an outer movable die, an intermediate movable die between the said stationary and outer movable dies, the intermediate movable die being rotatably carried by the stationary die, the outer movable die being rotatably carried by the intermediate die, and means for actuating the movable dies.

3. A crank shaft forming machine comprising a stationary die, an outer movable die, an intermediate movable die between the said stationary and outer movable dies, the intermediate movable die being rotatably carried by the stationary die, a bearing member on the intermediate die having bearing engagement with the outer movable die for rotatably supporting the outer movable die on the intermediate die, and means for actuating the movable dies.

4. A crank shaft forming machine comprising a stationary die, an outer movable die, an intermediate movable die between the said stationary and outer movable dies, a concentric lip on the side of the stationary die, a complemental groove in the proximate side of the intermediate die for receiving the lip, said lip serving as a bearing for rotatably supporting the intermediate movable die on the stationary die, a concentric lip on the side of the intermediate die, a complemental groove in the proximate side of the outer movable die for receiving the lip, said lip serving as a bearing for rotatably supporting the outer movable die on the intermediate movable die, and means for actuating said movable dies.

5. A crank shaft forming machine comprising a stationary die, an outer movable die and an intermediate movable die, the dies being recessed transversely to receive and support a crank shaft, the intermediate die being rotatably mounted adjacent the stationary die, the outer movable die being rotatably mounted adjacent the intermediate die, cover caps pivotally mounted on some of said dies, means for positively actuating the cap on one die and means on the positively actuated cap for automatically actuating an adjacent cap.

6. A crank shaft forming machine comprising a stationary die and a movable die, the dies being recessed to receive a crank shaft portion and at least one of said dies including a separable part to clamp said portion, means on one die interlocking with means on the other for securing the movable die against lateral separation from the stationary die and operatively supporting the movable die on the stationary die for slidable, reciprocatory movement in an arcuate path, and means for actuating the movable die.

7. A crank shaft forming machine comprising a stationary die and a movable die, the dies being recessed transversely to receive and support a crank shaft portion and at least one of said dies including a separable part to clamp said portion, means located between the stationary and movable dies and cooperating means on one of said dies for securing the movable die against lateral separation from the stationary die and supporting the movable die on the stationary die for movement thereon in an arcuate path, and means for actuating the movable die.

8. A crank shaft forming machine comprising a stationary die, an outer movable die and an intermediate movable die, the dies being recessed transversely to receive and support a crank shaft portion and some of said dies including a separable part to clamp said portion, the intermediate die being rotatably mounted adjacent the stationary die, means on the intermediate die cooperating with means on the outer movable die for wholly supporting the outer die on the intermediate die for sliding movement in an arcuate path, and means for actuating the movable dies.

9. A crank shaft forming machine comprising a stationary die and a movable die, the dies being recessed transversely to receive and support a crank shaft portion and at least one of said dies including a separable part to clamp said portion, slide bearing means on the stationary die cooperating with means on the movable die for preventing lateral separation of said dies and supporting the movable die on the stationary die for movement thereon in an arcuate path, and means for actuating the movable die.

10. A crank shaft forming machine comprising a stationary die, an outer movable die and an intermediate movable die, the dies being recessed transversely to receive and support a crank shaft portion and some of said dies including a separable part to clamp said portion, the intermediate die being rotatably mounted adjacent the stationary die, a bearing member on the intermediate die cooperating with means on the outer die for wholly supporting the outer die on the intermediate die for movement thereon in an arcuate path, and means for actuating the movable dies.

11. A crank shaft forming machine comprising a stationary die and a movable die, the dies being recessed transversely to receive and support a crank shaft portion and at least one of said dies including a separable part to clamp said portion, a concentric, semi-circular bearing lip on the side of one of said dies, a complemental groove in the proximate side of the other receiving the lip for preventing lateral separation of said dies and operatively supporting the movable die on the stationary die for sliding movement in an arcuate path, and means for actuating the movable die.

12. A crank shaft forming machine comprising a stationary die, an outer movable die and an intermediate movable die, the dies being recessed transversely to receive and support a crank shaft portion and some of said dies including a separable part to clamp said portion, the intermediate die being rotatably mounted adjacent the stationary die, a concentric semi-circular bearing lip on the side of the intermediate die, a complemental groove in the proximate side of the outer die receiving the lip for operatively supporting the movable die on the intermediate die for movement thereon in an arcuate path, and means for actuating the movable dies.

13. A crank shaft forming machine comprising a stationary die, an outer movable die and an intermediate movable die, the dies being recessed transversely to receive and support a crank shaft portion and some of said dies including a separable part to clamp said portion, the intermediate die being rotatably mounted adjacent the stationary die, means on the outer die cooperating with means on the intermediate die for operatively supporting the outer die on the intermediate die for sliding movement thereon in an arcuate path, means operable in a vertical plane for actuating the outer movable die independently of the intermediate die and by continued movement of the actuating means in the same direction, actuating both outer and intermediate dies together about the axis of the intermediate die.

14. A crank shaft forming machine comprising a stationary die, an outer movable die and an intermediate movable die, the dies being recessed transversely to receive and support a crank shaft portion and some of said dies including a separable part to clamp said portion, the intermediate die being rotatably mounted adjacent the stationary die, means on the outer die cooperating with means on the intermediate die for operatively supporting the outer die on the intermediate die for sliding movement thereon in an arcuate path, means operable in a vertical plane for actuating the outer movable die independently of the intermediate die while the intermediate die is free to move automatically in response to internal twisting strain on the crank shaft which is being formed, and by continued movement of the actuating means in the same direction, actuating both outer and intermediate dies together about the axis of the intermediate die.

15. A crank shaft forming machine comprising stationary die supporting means, movable die supporting means, dies on the stationary and movable supporting means, said dies including recesses to receive a crank shaft portion, at least one of said dies including a separable part to clamp said portion, interlocking means between the stationary and movable die supports for securing said supports against lateral separation and for carrying the movable die support and for guiding the movements of the latter in an arcuate path, and means for actuating the movable die support.

CLARENCE S. SWANSON.
DANA R. CORNELL.
CARL ALBIN ALDRIN.